UNITED STATES PATENT OFFICE.

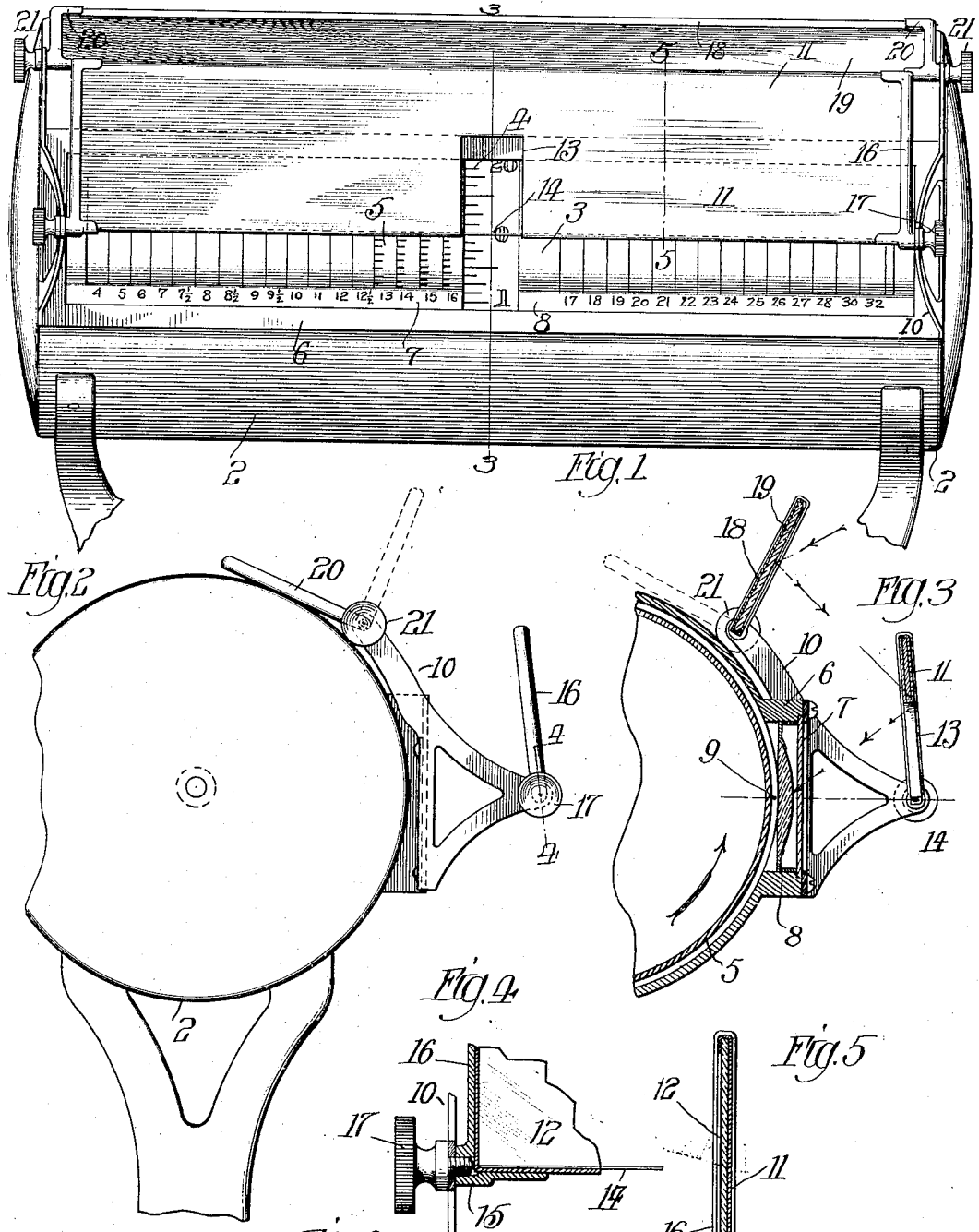

ALLEN DE VILBISS, JR., OF TOLEDO, OHIO, ASSIGNOR TO TOLEDO COMPUTING SCALE COMPANY, OF TOLEDO, OHIO, A CORPORATION OF NEW JERSEY.

COMPUTING-SCALE.

936,867.

Specification of Letters Patent.

Patented Oct. 12, 1909.

Application filed January 9, 1908. Serial No. 409,963.

*To all whom it may concern:*

Be it known that I, ALLEN DE VILBISS, Jr., a citizen of the United States, residing at Toledo, in the county of Lucas and State of Ohio, have invented certain new and useful Improvements in Computing - Scales, of which the following is a specification.

The chief object of the present invention is to effectually guard against erroneous reading of a chart of computing scales as can be done in some forms of such apparatus by directing the line of vision from above or below a point immediately in front of the reading line. For example, in computing scales of the familiar drum or cylinder type where the computations are arranged in circumferential series on a cylinder, it is possible by looking from a point above that directly in front of the reading line to read a greater value on the chart than that actually corresponding with the weight of the article whose value is being computed. On account of the necessarily light construction of the cylinder in such an apparatus and the necessity for allowing some clearance between the surface of the cylinder and the wire which is customarily employed to guide the eye in reading the chart, opportunity is afforded for viewing the chart from such an angle as to have such wire intersect appreciably higher computations on the chart than when viewed on a horizontal line. By the present invention such erroneous or dishonest use of scales is prevented by confining the line of vision to one directly in line with the proper computations on the chart, though no special provision is made for preventing the reading of the chart in such a way as to indicate less than the correct values because there would be no incentive for so reading the chart.

The drawings which accompany and form part of this specification illustrate a preferred form of embodiment of the invention as applied to a familiar type of computing scales.

Figure 1 represents a portion of said scales in front elevation as viewed from the user's side of the scales; Fig. 2 represents an end view of a portion of the scales shown in Fig. 1; Fig. 3 represents a section taken on the line 3—3 of Fig. 1; Fig. 4 is a sectional detail taken on the line 4—4 of Fig. 2; Fig. 5 is a section on the line 5—5 of Fig. 1; and Fig. 6 a diagram.

The reference numeral 2 designates the usual drum or barrel-shaped inclosing casing and 3 the cylinder or drum journaled therein and bearing a centrally located circumferential weight scale 4 and on either side thereof circumferential rows of computation graduations 5. The inclosing casing is as usual apertured longitudinally and formed with a rectangular frame 6 around the aperture. A glass or like transparency 7 fills the front part of this frame and back of that there is supported a magnifying glass 8. Between the magnifying glass and the cylinder there is stretched a wire 9.

When the cylinder is turned by the weight of goods it moves in the direction of the arrow (Fig. 3) and the chart should be read from a point directly in front and on a horizontal line so that the correct computation will be determined by the intersection of the wire 9 with the graduations immediately behind the same. However, owing to the necessity for some spacing between the wire and the cylinder it is possible by viewing the scales from a point above the horizontal to have the wire intersect a graduation some degrees in advance of the correct one, thus denoting a higher value than should be computed as diagrammatically illustrated in Fig. 6.

In carrying out the present invention a pair of brackets 10 are secured to the ends of the frame 6 and project outwardly and upwardly and rearwardly therefrom. Between outer portions of these brackets there is supported a guard or shield comprising a metal plate 11 flanged as shown in Fig. 5 and a reflecting glass 12 held by the flanges. This shield or guard is so mounted that its lower longitudinal edge is in the horizontal plane of the reading wire 9 as indicated in Fig. 3 and the shield or guard when in use stands upright. Hence it serves to obstruct any line of vision which would enable such an incorrect reading of the chart to be had as that above mentioned.

The weight scale is not so finely subdivided as the computation scales and there is not the same chance for erroneously reading it by looking from above nor is it of as much importance to guard against this where the weight scale is concerned because the actual computation is inscribed upon the surface of the chart and not mentally computed from what the weight scale shows. Therefore, in order to afford the usual extensive view of the weight scale the shield or guard above described is cut away in the middle as shown at 13. Preferably a wire 14 is run through the lower flanged portion of the metal back 11 of the shield or guard and extended across the cut-away portion 13 so as to aline with the reading wire 9 over the weight scale.

The above-described shield or guard is preferably pivoted or pivotally mounted so as to be angularly adjustable with reference to the chart. Thus the reflecting glass 12 can be used to the best advantage for throwing light upon the chart. The means here shown for effecting the pivotal mounting of the shield comprise screw-threaded bosses 15 formed on the end pieces 16 of the shield, and thumb screws 17 passing loosely through apertures in the brackets 10 and screwing into said bosses. It will be seen that by this simple arrangement angular adjustment of the shield or guard is made possible and the securing of it at different adjustments.

As in the use of the scales the position occupied by them may be such as to cause the above-described shield or guard to cast a shadow upon the chart, there is preferably employed an additional reflector whereby when the light strikes from the front of the scales it will be reflected to the glass 12 and thence to the chart. This reflector is constructed quite similarly to the shield or guard already described. It comprises a metal backing 18 flanged to hold the reflecting glass 19, and end-pieces 20 with bosses such as those already described. Thumb screws 21 are employed, the same passing through apertures in the rear parts of the brackets 10 and engaging the said bosses so that the reflector can be angularly adjusted to suit varying requirements in the matter of casting light upon the chart and secured at different adjustments.

It will be seen that the above-described construction is well adapted to fulfil the object primarily stated. It is to be noted that the lower longitudinal edge of the shield or guard is in alinement with the axis on which this shield or guard turns when being angularly adjusted. Hence the relation between this lower longitudinal edge and the reading wire 9 is unaffected by such adjustment of the shield or guard. While the shield or guard prevents reading of the chart from an elevated point it does not obstruct the vision from below and hence presents no difficulty in the matter of gaining a sufficient view of the chart to clearly see the computation numeral. Of course a reading of the chart from so low a point as to make the reading wire 9 cut or intersect a lower computation than the proper one is of no consequence because the scales would never be placed so high as to have this naturally occur and there would be no incentive for the user to contrive to so read the chart.

It is of course to be understood that the construction here shown and described may be modified and that the invention is not limited to the details of that construction.

What is claimed is:

1. In apparatus of the character described, the combination with an inclosing casing having a display aperture and a body supplying a reading line extending across the same, and a movable body within said casing and bearing a table or chart of graduations for series of computations by differing prices per unit of measure; of a guard or shield obstructing a line of sight which would take in the reading line as intersecting that portion of the chart bearing higher value computation graduations than those immediately behind the reading line.

2. In apparatus of the character described, the combination with an inclosing casing having a display aperture and a body supplying a reading line extending across the same, and a movable body within said casing and bearing a table or chart of graduations for series of computations by differing prices per unit of measure; of a guard or shield spaced from the chart and casing and obstructing a line of sight which would take in the reading line as intersecting that portion of the chart bearing higher value computation graduations than those immediately behind the reading line.

3. In apparatus of the character described, the combination with an inclosing casing having a display aperture and a body supplying a reading line extending across the same, and a movable body within said casing and bearing a table or chart of graduations for series of computations by differing prices per unit of measure; of a guard or shield having one edge substantially in a plane embracing the reading line and the portion of the chart immediately behind the latter.

4. In apparatus of the character described, the combination with an inclosing casing having a display aperture and a body supplying a reading line extending across the same, and a movable body within said casing and bearing a table or chart of graduations for series of computations by differing prices per unit of measure; of a guard or shield spaced from the chart and casing and having one edge substantially in a plane embracing the reading line and the portion of the chart immediately behind the latter.

5. In apparatus of the character described, the combination with an inclosing casing having a display aperture and a body supplying a reading line extending across the same, and a movable body within said casing and bearing a table or chart of graduations for series of computations by differing prices per unit of measure; of a guard or shield spaced from the chart and casing and obstructing a line of sight which would take in the reading line as intersecting that portion of the chart bearing higher value computation graduations than those immediately behind the reading line, said shield having a reflecting inner surface to cast light upon the chart.

6. In apparatus of the character described, the combination with an inclosing casing having a display aperture and a body supplying a reading line extending across the same, and a movable body within said casing and bearing a table or chart of graduations for series of computations by differing prices per unit of measure; of a guard or shield spaced from the chart and casing and having one edge substantially in a plane embracing the reading line and the portion of the chart immediately behind the latter, said shield having a reflecting inner surface to cast light upon the chart.

7. In apparatus of the character described, the combination with an inclosing casing having a display aperture and a body supplying a reading line extending across the same, and a movable body within said casing and bearing a table or chart of graduations for series of computations by differing prices per unit of measure; of a guard or shield spaced from the chart and casing and obstructing a line of sight which would take in the reading line as intersecting that portion of the chart bearing higher value computation graduations than those immediately behind the reading line, said shield having a reflecting inner surface to cast light upon the chart and being adjustable to varying angles; substantially as and for the purpose described.

8. In apparatus of the character described, the combination with an inclosing casing having a display aperture and a body supplying a reading line extending across the same, and a movable body within said casing and bearing a table or chart of graduations for series of computations by differing prices per unit of measure; of a guard or shield spaced from the chart and casing and having one edge substantially in a plane embracing the reading line and the portion of the chart immediately behind the latter, said shield having a reflecting inner surface to cast light upon the chart and being adjustable to varying angles; substantially as and for the purpose described.

9. In apparatus of the character described, the combination with an inclosing casing having a display aperture and a body supplying a reading line extending across the same, and a movable body within said casing and bearing a table or chart of graduations for series of computations by differing prices per unit of measure; of a guard or shield spaced from the chart and casing and obstructing a line of sight which would take in the reading line as intersecting that portion of the chart bearing higher value computation graduations than those immediately behind the reading line, said shield having a reflecting inner surface to cast light upon the chart and being pivotally mounted and adjustable to varying angles; substantially as and for the purpose described.

10. In apparatus of the character described, the combination with an inclosing casing having a display aperture and a body supplying a reading line extending across the same, and a movable body within said casing and bearing a table or chart of graduations for series of computations by differing prices per unit of measure; of a guard or shield spaced from the chart and casing and having one edge substantially in a plane embracing the reading line and the portion of the chart immediately behind the latter, said shield having a reflecting inner surface to cast light upon the chart and being pivotally mounted and adjustable to varying angles; substantially as and for the purpose described.

11. In apparatus of the character described, the combination with an inclosing casing having a display aperture and a body supplying a reading line extending across the same, and a movable body within said casing and bearing a table or chart of graduations for series of computations by differing prices per unit of measure; of a guard or shield spaced from the chart and casing and obstructing a line of sight which would take in the reading line as intersecting that portion of the chart bearing higher value computation graduations than those immediately behind the reading line, said shield having a reflecting inner surface to cast light upon the chart, and a second reflector to cast light upon the said surface of said shield.

12. In apparatus of the character described, the combination with an inclosing casing having a display aperture and a body supplying a reading line extending across the same, and a movable body within said casing and bearing a table or chart of graduations for series of computations by differing prices per unit of measure; of a guard or shield spaced from the chart and casing and having one edge substantially in a plane embracing the reading line and the portion of the chart immediately behind the latter, said shield having a reflecting inner surface to cast light upon the chart, and a second reflector to cast light upon the said surface of said shield.

13. In apparatus of the character described, the combination with an inclosing casing having a display aperture and a body supplying a reading line extending across the same, and a movable body within said casing and bearing a table or chart of graduations for series of computations by differing prices per unit of measure; of a guard or shield spaced from the chart and casing and obstructing a line of sight which would take in the reading line as intersecting that portion of the chart bearing higher value computation graduations than those immediately behind the reading line, said shield having a reflecting inner surface to cast light upon the chart and being adjustable to varying angles, and a second reflector to cast light upon the said surface of said shield, said second reflector being likewise adjustable.

14. In apparatus of the character described, the combination with an inclosing casing having a display aperture and a body supplying a reading line extending across the same, and a movable body within said casing and bearing a table or chart of graduations for series of computations by differing prices per unit of measure; of a guard or shield spaced from the chart and casing and having one edge substantially in a plane embracing the reading line and the portion of the chart immediately behind the latter, said shield having a reflecting inner surface to cast light upon the chart and being adjustable to varying angles, and a second reflector to cast light upon the said surface of said shield, said second reflector being likewise adjustable.

15. In apparatus of the character described, the combination with an inclosing casing having a display aperture and a body supplying a reading line extending across the same, and a movable body within said casing and bearing a table or chart of graduations for series of computations by differing prices per unit of measure; of a guard or shield spaced from the chart and casing and obstructing a line of sight which would take in the reading line as intersecting that portion of the chart bearing higher value computation graduations than those immediately behind the reading line, said shield having a reflecting inner surface to cast light upon the chart and being pivotally mounted and adjustable to varying angles, and a second pivotally mounted and adjustable reflector to cast light upon the said surface of said shield.

16. In apparatus of the character described, the combination with an inclosing casing having a display aperture and a body supplying a reading line extending across the same, and a movable body within said casing and bearing a table or chart of graduations for series of computations by differing prices per unit of measure and a centrally located weight scale; of a guard or shield obstructing a view of the reading line as intersecting that portion of the chart exposed by the display aperture, which portion bears higher value computation graduations than those immediately behind the reading line, said shield being cut away to fully expose as much of the weight scale as the display aperture exposes.

17. In apparatus of the character described, the combination with an inclosing casing having a display aperture and a body supplying a reading line extending across the same, and a movable body within said casing and bearing a table or chart of graduations for series of computations by differing prices per unit of measure and a centrally located weight scale; of a guard or shield spaced from the chart and casing and obstructing a line of sight which would take in the reading line as intersecting that portion of the chart bearing higher value computation graduations than those immediately behind the reading line, said shield being cut away to fully expose as much of the weight scale as the display aperture exposes.

18. In apparatus of the character described, the combination with an inclosing casing having a display aperture and a body supplying a reading line extending across the same, and a movable body within said casing and bearing a table or chart of graduations for series of computations by differing prices per unit of measure and a centrally located weight scale; of a guard or shield and casing and obstructing a line of sight which would take in the reading line as intersecting that portion of the chart bearing higher value computation graduations than those immediately behind the reading line, said shield being cut away to fully expose as much of the weight scale as the display aperture exposes, and having a reading line extending across the cut-away portion to register with the first-mentioned reading line.

19. In apparatus of the character described, the combination with an inclosing casing having a display aperture and a body supplying a reading line extending across the same, and a movable body within said casing and bearing a table or chart of graduations for series of computations by differing prices per unit of measure and a centrally located weight scale; of a guard or shield spaced from the chart and casing and obstructing a line of sight which would take in the reading line as intersecting that portion of the chart bearing higher value computation graduations than those immediately behind the reading line, said shield being cut away to fully expose as much of the weight scale as the display aperture exposes, and having a reading line extending across the cut-away portion to register with the first-mentioned reading line.

20. In apparatus of the character described, the combination with a horizontally arranged cylindrical casing having a longitudinal display aperture and a body supplying a reading line extending from side to side thereof spaced from its top and bottom, and a cylinder mounted to rotate within said casing and bearing a chart or table of circumferential series of graduations for computations by differing prices per unit of measure; of a guard or shield mounted in front of the display aperture with a longitudinal edge in a plane of the reading line and the axis of the cylinder.

21. In apparatus of the character described, the combination with a horizontally arranged cylindrical casing having a longitudinal display aperture and a body supplying a reading line extending from side to side thereof spaced from its top and bottom, and a cylinder mounted to rotate within said casing and bearing a chart or table of circumferential series of graduations for computations by differing prices per unit of measure; of a guard or shield mounted in front of the display aperture and spaced therefrom with a longitudinal edge in a plane of the reading line and the axis of the cylinder.

22. In apparatus of the character described, the combination with a horizontally arranged cylindrical casing having a longitudinal display aperture and a body supplying a reading line extending from side to side thereof spaced from its top and bottom, and a cylinder mounted to rotate within said casing and bearing a chart or table of circumferential series of graduations for computations by differing prices per unit of measure; of a guard or shield mounted in front of the display aperture and spaced therefrom with a longitudinal edge in a plane of the reading line and the axis of the cylinder, said shield having a reflecting inner surface to cast light upon the chart.

23. In apparatus of the character described, the combination with a horizontally arranged cylindrical casing having a longitudinal display aperture and a body supplying a reading line extending from side to side thereof spaced from its top and bottom, and a cylinder mounted to rotate within said casing and bearing a chart or table of circumferential series of graduations for computations by differing prices per unit of measure; of a guard or shield mounted in front of the display aperture and spaced therefrom with a longitudinal edge in a plane of the reading line and the axis of the cylinder and being adjustable to varying angles; substantially as and for the purpose described.

24. In apparatus of the character described, the combination with a horizontally arranged cylindrical casing having a longitudinal display aperture and a body supplying a reading line extending from side to side thereof spaced from its top and bottom, and a cylinder mounted to rotate within said casing and bearing a chart or table of circumferential series of graduations for computations by differing prices per unit of measure; of a guard or shield mounted in front of the display aperture and spaced therefrom with a longitudinal edge in a plane of the reading line and the axis of the cylinder and being pivotally mounted and adjustable to varying angles; substantially as and for the purpose described.

25. In apparatus of the character described, the combination with a horizontally arranged cylindrical casing having a longitudinal display aperture and a body supplying a reading line extending from side to side thereof spaced from its top and bottom, and a cylinder mounted to rotate within said casing and bearing a chart or table of circumferential series of graduations for computations by differing prices per unit of measure; of a guard or shield mounted in front of the display aperture and spaced therefrom with a longitudinal edge in a plane of the reading line and the axis of the cylinder, said shield having a reflecting inner surface to cast light upon the chart; and a second reflector to cast light upon the said surface of said shield.

26. In apparatus of the character described, the combination with a horizontally arranged cylindrical casing having a longitudinal display aperture and a body supplying a reading line extending from side to side thereof spaced from its top and bottom, and a cylinder mounted to rotate within said casing and bearing a chart or table of circumferential series of graduations for computations by differing prices per unit of measure; of a guard or shield mounted in front of the display aperture and spaced therefrom with a longitudinal edge in a plane of the reading line and the axis of the cylinder, said shield being adjustable to varying angles and having a reflecting inner side; and a second reflector adapted to cast light upon said inner surface of the shield, said second reflector being likewise adjustable.

27. In apparatus of the character described, the combination with a horizontally arranged cylindrical casing having a longitudinal display aperture and a body supplying a reading line extending from side to side thereof spaced from its top and bottom, and a cylinder mounted to rotate within said casing and bearing a chart or table of circumferential series of graduations for computations by differing prices per unit of measure; of a guard or shield in front of the display aperture and spaced therefrom with a longitudinal edge in a plane of the reading line and the axis of the cylinder, said shield having a reflecting surface to cast light upon the chart and being pivotally mounted and adjustable to varying angles, and a second pivotally mounted and adjustable reflector to cast light upon the said surface of said shield.

28. In apparatus of the character described, the combination with a horizontally arranged cylindrical casing having a longitudinal display aperture and a body supplying a reading line extending from side to side thereof spaced from its top and bottom, and a cylinder mounted to rotate within said casing and bearing a chart or table of circumferential series of graduations for computations by differing prices per unit of measure and a centrally located weight scale; of a guard or shield mounted in front of the display aperture and spaced therefrom with a longitudinal edge in a plane of the reading line and the axis of the cylinder, said shield being cut away to fully expose as much of the weight scale as the display aperture exposes.

29. In apparatus of the character described, the combination with a horizontally arranged cylindrical casing having a longitudinal display aperture and a body supplying a reading line extending from side to side thereof spaced from its top and bottom, and a cylinder mounted to rotate within said casing and bearing a chart or table of circumferential series of graduations for computations by differing prices per unit of measure and a centrally located weight scale; of a guard or shield mounted in front of the display aperture and spaced therefrom with a longitudinal edge in a plane of the reading line and the axis of the cylinder, said shield being cut away to fully expose as much of the weight scale as the display aperture exposes and having a reading line extending across the cut-away portion to register with the first-mentioned reading line.

30. In apparatus of the character described, the combination with a horizontally arranged cylindrical casing having a longitudinal display aperture and a body supplying a reading line extending from side to side thereof spaced from its top and bottom, and a cylinder mounted to rotate within said casing and bearing a chart or table of circumferential series of graduations for computations by differing prices per unit of measure; of brackets projecting forward at opposite sides of the casing, and a shield or guard carried by said brackets with a longitudinal edge in a plane of the reading line and the axis of the cylinder.

31. In apparatus of the character described, the combination with a horizontally arranged cylindrical casing having a longitudinal display aperture and a body supplying a reading line extending from side to side thereof spaced from its top and bottom, and a cylinder mounted to rotate within said casing and bearing a chart or table of circumferential series of graduations for computations by differing prices per unit of measure; of brackets projecting forward at opposite sides of the casing, and a shield or guard pivotally and adjustably supported by said brackets with a longitudinal axial edge in a plane of the reading line and the axis of the cylinder, said shield having a reflecting inner surface.

32. In apparatus of the character described, the combination with a horizontally arranged cylindrical casing having a longitudinal display aperture and a body supplying a reading line extending from side to side thereof spaced from its top and bottom, and a cylinder mounted to rotate within said casing and bearing a chart or table of circumferential series of graduations for computations by differing prices per unit of measure; of brackets projecting forward at opposite sides of the casing, and a shield or guard carried by said brackets with a longitudinal edge in a plane of the reading line and the axis of the cylinder, said shield or guard having a reflecting inner surface, and a second reflector also carried by said brackets and arranged to cast light upon said reflecting surface of the shield or guard.

33. In apparatus of the character described, the combination with a horizontally arranged cylindrical casing having a longitudinal display aperture and a body supplying a reading line extending from side to side thereof spaced from its top and bottom, and a cylinder mounted to rotate within said casing and bearing a chart or table of circumferential series of graduations for computations by differing prices per unit of measure; of brackets projecting forward at opposite sides of the casing, a shield or guard pivotally and adjustably supported by said brackets with a longitudinal axial edge in a plane of the reading line and the axis of the cylinder, said shield having a reflecting inner surface, and a reflector pivotally and adjustably supported by said brackets to cast light upon the said inner surface of the shield.

ALLEN DE VILBISS, Jr.

Witnesses:
Wm. D. Walker,
C. C. Lake.